(12) United States Patent
Abels et al.

(10) Patent No.: US 11,278,378 B2
(45) Date of Patent: Mar. 22, 2022

(54) ORTHODONTIC DEVICE

(71) Applicants: Norbert Abels, Homburg (DE); Claus Backes, Saarbrucken (DE)

(72) Inventors: Norbert Abels, Homburg (DE); Claus Backes, Saarbrucken (DE)

(*) Notice: Subject to any disclaimer, the term of this patent is extended or adjusted under 35 U.S.C. 154(b) by 32 days.

(21) Appl. No.: 16/341,337

(22) PCT Filed: Oct. 12, 2017

(86) PCT No.: PCT/EP2017/076062
§ 371 (c)(1),
(2) Date: Apr. 11, 2019

(87) PCT Pub. No.: WO2018/069444
PCT Pub. Date: Apr. 19, 2018

(65) Prior Publication Data
US 2020/0038144 A1 Feb. 6, 2020

(30) Foreign Application Priority Data
Oct. 12, 2016 (LU) .................... LU93260

(51) Int. Cl.
*A61C 7/36* (2006.01)
*A61C 7/14* (2006.01)
*A61C 7/02* (2006.01)
*A61C 7/08* (2006.01)

(52) U.S. Cl.
CPC .............. *A61C 7/146* (2013.01); *A61C 7/02* (2013.01); *A61C 7/08* (2013.01); *A61C 7/36* (2013.01)

(58) Field of Classification Search
CPC .... A61C 7/02; A61C 7/08; A61C 7/36; A61C 7/146; A61C 7/10; A61F 5/566

USPC .............. 433/5, 7, 18, 19, 21, 22, 24
See application file for complete search history.

(56) References Cited

U.S. PATENT DOCUMENTS

| 2,936,523 | A | * | 5/1960 | Tifft | ............. | A61C 13/28 |
| | | | | | | 433/179 |
| 4,472,139 | A | * | 9/1984 | Rosenberg | ............ | A61C 7/36 |
| | | | | | | 433/19 |
| 4,618,324 | A | * | 10/1986 | Nord | ............. | A61C 7/36 |
| | | | | | | 433/19 |

(Continued)

FOREIGN PATENT DOCUMENTS

| DE | 10216242 C1 | * | 4/2003 | ............. | A61F 5/566 |
| DE | 10331531 A1 | * | 2/2005 | ............. | A61F 5/566 |

(Continued)

OTHER PUBLICATIONS

Translation for FR 1079955 (Year: 1954).*
Translation for WO2011127893 (Year: 2011).*
International Search Report for PCT Application No. PCT/EP2017/076062, dated Dec. 5, 2017.

(Continued)

*Primary Examiner* — Edward Moran
*Assistant Examiner* — Matthew P Saunders
(74) *Attorney, Agent, or Firm* — Kowert, Hood, Munyon, Rankin & Goetzel, P.C.; Gareth M. Sampson

(57) ABSTRACT

An orthodontic device which may be used for treating Class II malocclusions including one or more rotational joints having a movable axis of rotation and an extension assembly having at least two reciprocating rods. Advantageously, the device may be elasticated or an unelasticated and may, with minimal reconfiguration, be used for further treatment, for example by being reversed.

14 Claims, 11 Drawing Sheets

(56) References Cited

U.S. PATENT DOCUMENTS

| | | | |
|---|---|---|---|
| 5,074,784 A * | 12/1991 | Sterrett | A61C 7/36 433/18 |
| 5,312,247 A * | 5/1994 | Sachdeva | A61C 7/10 433/18 |
| 5,711,667 A | 1/1998 | Vogt | |
| 5,738,514 A | 4/1998 | DeVincenzo et al. | |
| 5,829,975 A * | 11/1998 | Gold | A61C 7/36 433/19 |
| 5,964,588 A | 10/1999 | Cleary | |
| 6,120,289 A * | 9/2000 | Cleary | A61C 7/36 433/19 |
| 6,162,051 A * | 12/2000 | Brehm | A61C 7/36 433/19 |
| 6,361,315 B1 * | 3/2002 | Hanks | A61C 7/10 433/19 |
| 6,568,935 B2 * | 5/2003 | Clark | A61C 7/00 433/18 |
| 9,993,317 B2 * | 6/2018 | Kottemann | A61C 7/36 |
| 2010/0285422 A1 * | 11/2010 | Wiechmann | A61C 7/36 433/18 |
| 2014/0272759 A1 * | 9/2014 | Dischinger | A61C 7/36 433/19 |

FOREIGN PATENT DOCUMENTS

| | | | | |
|---|---|---|---|---|
| EP | 1712203 | | 10/2006 | |
| FR | 1079955 A | * | 12/1954 | A61C 7/36 |
| JP | 2011161715 | | 6/2001 | |
| WO | WO-2011127893 A1 | * | 10/2011 | A61F 5/566 |

OTHER PUBLICATIONS

Written Opinion for PCT Application No. PCT/EP2017/076062, dated Dec. 5, 2017.

International Preliminary Report on Patentability for PCT Application No. PCT/EP2017/076062, dated Nov. 30, 2018.

* cited by examiner

ORTHODONTIC DEVICE

TECHNICAL FIELD

Embodiments of the invention relate to an orthodontic device. Further embodiments extend to a corresponding method.

BACKGROUND

Orthodontic appliances for treating Class II and III malocclusions include various types. Some of these appliances connect near a lower molar with the distal end connected to a strand near the upper canine. However, such appliances suffer from the disadvantage that they are unsightly. It is preferable, therefore, to attach the appliances between the lower and upper molars, as this reduces the visibility of the appliance.

The devices which attach between the upper and lower molars include two types: elasticated and non-elasticated. The elasticated type includes a spring or elasticated material to provide a biasing force. An example of such a device is disclosed in WO 2016/085606. However, such elasticated devices suffer from the disadvantage that the spring or elasticated material provides an inconstant biasing force over time due to degradation. Furthermore, a spring can impose significant discomfort for the patient.

Non-elasticated orthodontic devices for treating Class II and III malocclusions are known, such as that disclosed in US 2007/0224567, but this device, and similar devices disclosed in the art, suffer from the disadvantage that they are rigid and therefore do not accommodate the natural movements of the lower jaw, which can also lead to significant discomfort.

A further significant disadvantage of known unelasticated molar-to-molar devices lies in their overall length. It is desirable to reduce the length for mechanical and cosmetic reasons, but it is essential that these devices still provide the required leverage to treat the specific malocclusion.

SUMMARY

According to a first aspect of the invention, there is provided an unelasticated orthodontic device comprising:
- a first attachment for attaching the device to an upper molar;
- a second attachment for attaching the device to a lower molar;
- an extension assembly connected by a first hinge to the first attachment and by a second hinge to the second attachment;
- wherein at least the first hinge provides rotation about an axis wherein the axis is moveable relative to the first attachment; and
- wherein the extension assembly comprises two rods arranged to reciprocate relative to one another and attached to one another, wherein the extension assembly further comprises at least one stop to prevent elongation of the extension assembly past a first predetermined position and prevent compression of the extension assembly past a second predetermined position.

The extension assembly may comprise two collars attached to respective ends of the two rods, said collars providing said stop, wherein said extension assembly is adapted to receive a spring mounted between said collars.

The stop may be provided by said two collars and two anchor plates.

The extension assembly may be adapted to receive a spring mounted between one of said collars and the first hinge.

The two rods of the extension assembly may be engaged with one another to allow the rods to reciprocate.

The two rods of the extension assembly may be formed to engage with one another.

The two rods may engage with one another with a tongue and groove joint wherein the tongue is formed length-wise in one of said rods and the groove is formed length-wise in the other of said rods.

The rods may be engaged with one another by a pin attached to one of said rods and an elongate void formed in another of said rods so that said pin may be located in said void to allow the rods to reciprocate.

The rods may be curved.

The extension assembly may comprise three rods. The rods may be engaged with one another to allow reciprocation.

A first rod may be engaged with a second rod. The second rod may be engaged with a third rod.

The rods may be engaged by means of tongue and groove joints.

The rods may be engaged by a pin located in a corresponding void.

The first hinge may comprise a flail joint.

The flail joint comprises a torus mounted in voids formed in the first attachment and in the extension assembly.

The torus may have a larger portion to limit movement of one of said voids relative to the torus.

The second hinge may comprise a ball pin mounted in a void formed in the extension assembly. The void may be larger than a diameter of a pin portion of the ball pin, thereby allowing the second attachment to move laterally and pivot relative to the extension assembly.

The orthodontic device may be reversible so that the second attachment may be attached to an upper canine and the first attachment may be attached to a lower molar.

According to a second aspect of the invention, there is provided an elasticated orthodontic device comprising an orthodontic device according to the first aspect of the invention. The elasticated orthodontic device may further comprise a spring.

The spring may be located between two collars, or between a collar and an anchor plate.

The orthodontic device may be suitable for the use of any one or more of the group consisting of:
moving upper teeth in a posterior direction; and
mandible advancement.

The orthodontic device may be suitable for moving upper teeth in a posterior direction and for mandible advancement in a first configuration. The orthodontic device may be suitable for additional mandible advancement in a second configuration.

DESCRIPTION OF ACCOMPANYING FIGURES

Embodiments of the invention are described with reference to the accompanying schematic diagrams where:
FIG. 1 illustrates an orthodontic device according to a first embodiment;
FIG. 2 illustrates the orthodontic device of FIG. 1 in a differing configuration;

DESCRIPTION OF EMBODIMENTS

Figure 1A:
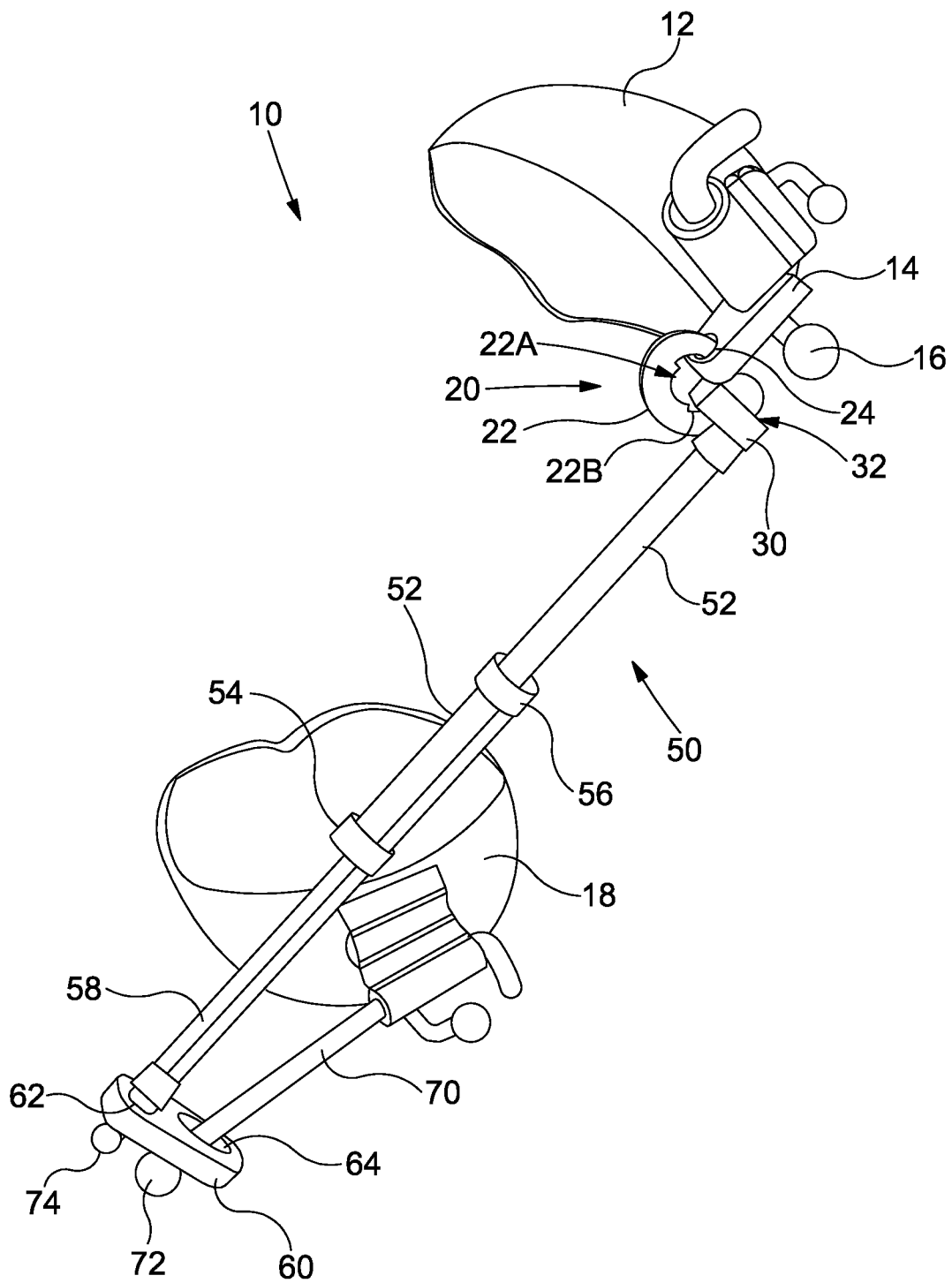

FIG. 1 illustrates an unelastic orthodontic device 10 according to an embodiment of the invention. As used herein, the term "unelastic" means an orthodontic device which, in its most basic configuration, does not require the use of an elasticated material, spring or other means of providing a biasing force to provide a therapeutic use. However, this does not exclude a device where a spring or other means of providing a biasing force may be optionally included.

The orthodontic device 10 comprises molar bands 12 and 18 for attachment to respective upper and lower molars. The molar band 12 is attached to an anchor plate 14 by means of a pin 16. The anchor plate 14 forms an anchor for the flail joint 20. The flail joint 20 further comprises a torus 22 which is located within void 24 formed on the anchor plate 14. The torus 22 is further located with a void 32 formed in a second anchor plate 30.

The anchor plate 30 forms part of the extension assembly 50, as described in further detail below.

The torus 22 comprises a section 22A having an enlarged radius compared to the section 22B. Section 22B is dimensioned to fit within the voids 24 and 32 formed in the respective anchor plates 14 and 30.

Therefore, the flail joint 20 allows limited movement between the molar band 12 and the extension assembly 50. Furthermore, since the voids 24 and 32 are formed to allow a degree of play between the torus 22 and the anchor plates 14 and 30, the flail joint 20 allows movement of the axis of rotation between the anchor plate 14 and the anchor plate 30.

The extension assembly 50 comprises the anchor plate 30 which is attached to a first extension rod 52. The extension rod 52 is mounted to a collar 54 and situated within a second collar 56. The extension rod 52 is attached to the collar 54, but is movable relative to the collar 56. The collar 56 is attached to a further extension rod 58 which, in a similar manner, is free to move relative to collar 54, but is attached to collar 56.

The collars 54 and 56 act as stops preventing the extension assembly from extending past a predetermined position. Furthermore, in conjunction with the anchor plates 30 and 60, the collars 54 and 56 prevent the extension assembly from contracting past a predetermined position.

The extension rods 52 and 58 are semicircular rods (having a D-shaped cross-section) which, in the arrangement shown, reciprocate relative to one another when a patient's jaw is opened and closed.

The extension rod 58 is attached to anchor plate 60 through a void 62 formed on the anchor plate 60. A second void 64 is formed in anchor plate 60 and the connecting rod 70 is located within the void 64. Respective heads 72 and 74 formed on the end of rods 70 and 58 prevent those rods from disengaging from the anchor plate 60. It is noted that the void 64 is larger than the diameter of the rod 70 thereby allowing a certain degree of freedom of movement of the rod 70 relative to the anchor plate 60. In this respect, rod 58, anchor plate 60 and rod 70 form a further flail joint which allows limited rotation, and allows movement of the axis of rotation to accommodate lateral movement of the jaws relative to one another.

Embodiments of the invention, by using an extension assembly as described in conjunction with rotational joints allowing movement of the axis of rotation, help to ensure that the overall length of the orthodontic device is reduced without affecting the efficacy of the treatment. Furthermore, these factors help to ensure that the overall length of the device remains small, thereby limiting the cosmetic impact.

Figure 1B:
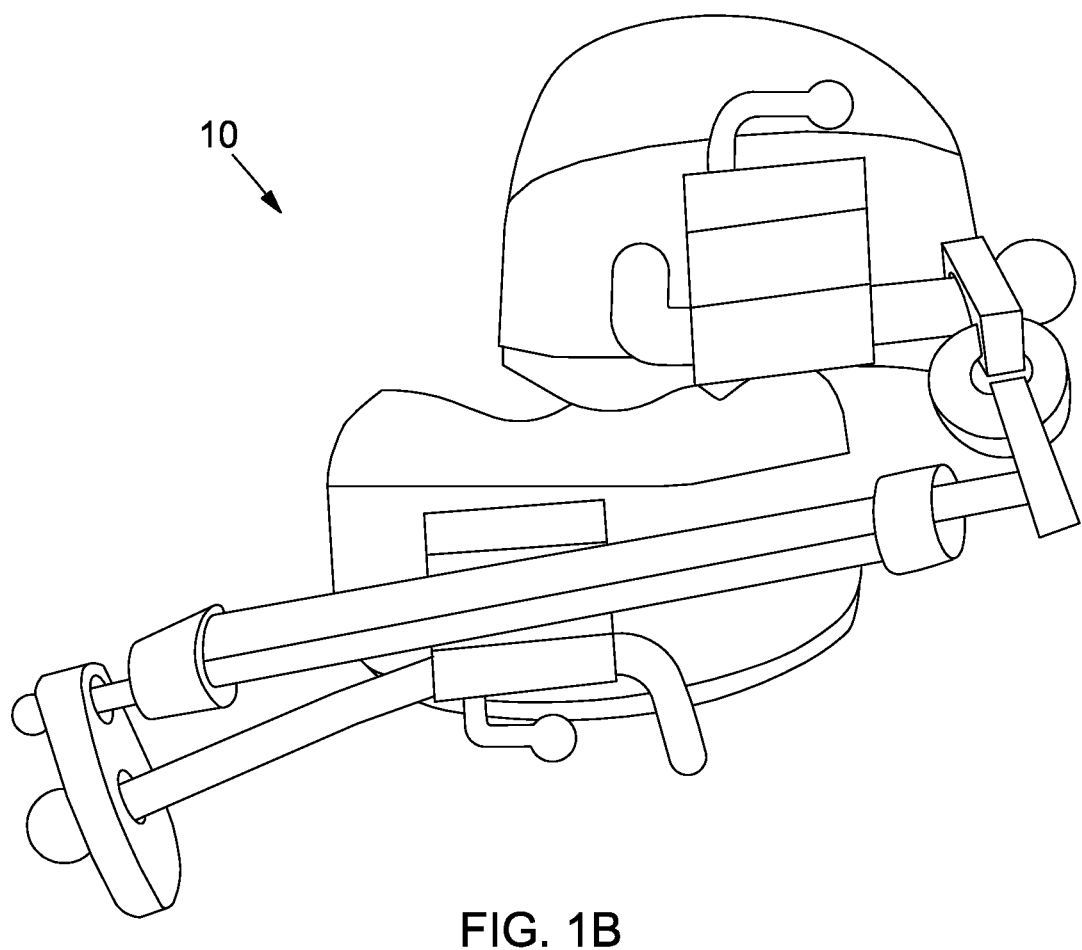

FIG. 1B illustrates the orthodontic device 10 in a configuration when a patient's mouth is closed. As illustrated, the overall length remains relatively small. In addition, any discomfort to the patient is reduced over many prior art devices due to the freedoms of movement in the rotational joints.

A further advantage of embodiments of the invention is that the same device may be used in different treatments and in different configurations. Advantageously, the same device may also be used as an elasticated orthodontic device.

Figure 2A:
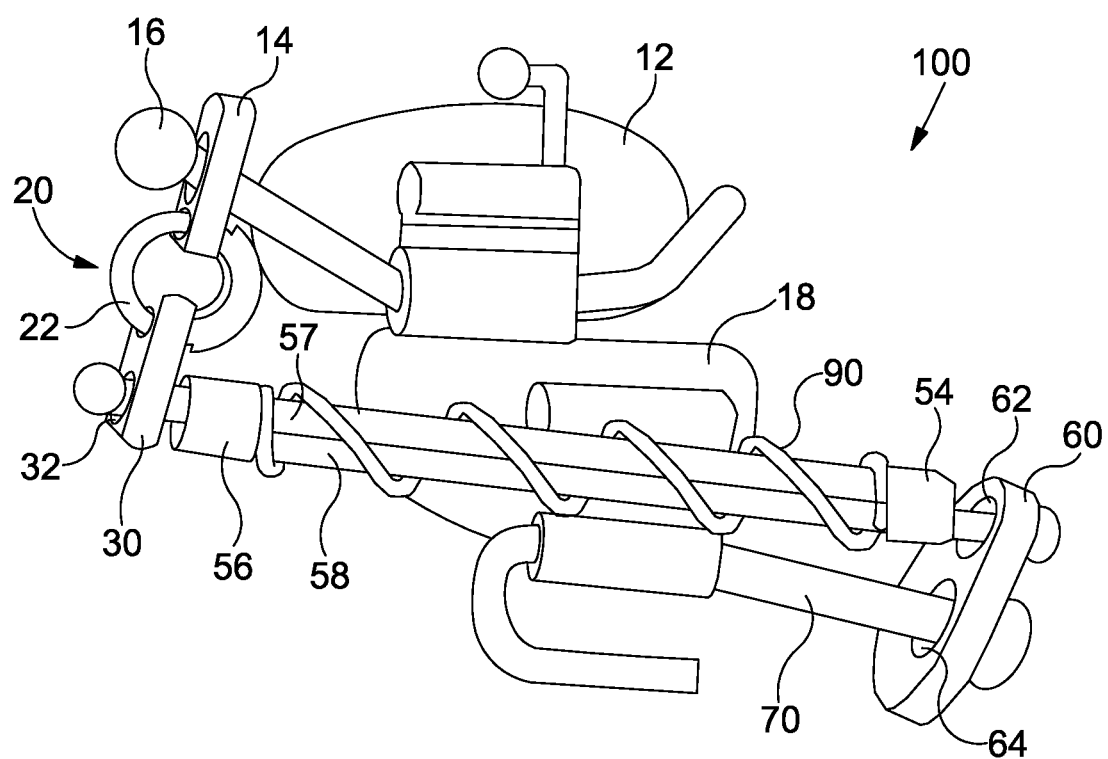

FIG. 2A illustrates an orthodontic device 100 according to a further embodiment of the invention. The device 100 is similar to the device 10, but includes the addition of a spring 90 situated between collars 54 and 56. FIG. 2A illustrates the orthodontic device 100 and the orientation assumed when a patient's mouth is closed.

Figure 2B:
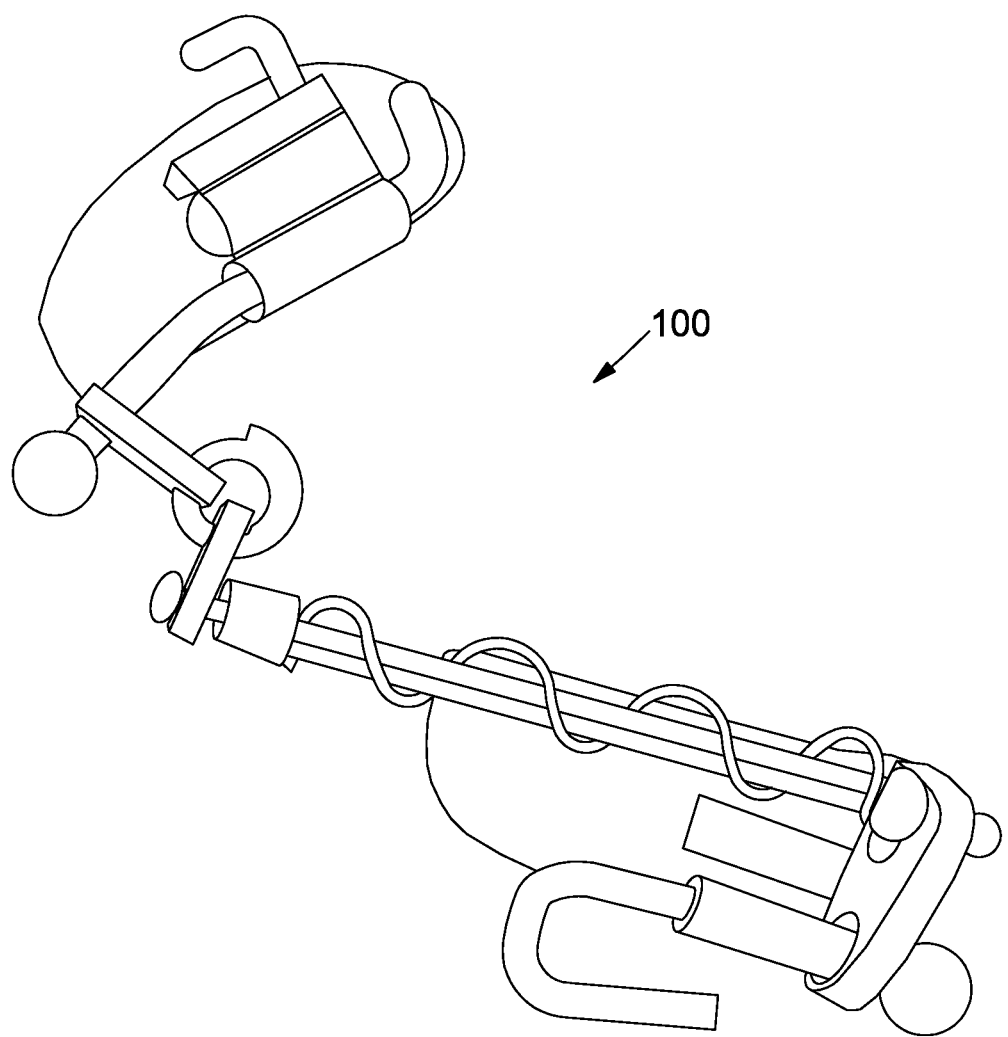

FIG. 2B illustrates the orthodontic device 100 in the orientation assumed when a patient's mouth is open.

Advantageously, embodiments of the invention may be used in different treatment regimes. The devices described above and illustrated in FIGS. 1 and 2 may be used for the treatment of Class II malocclusions. However, the same device may be used in a reversed configuration.

Figure 3A:
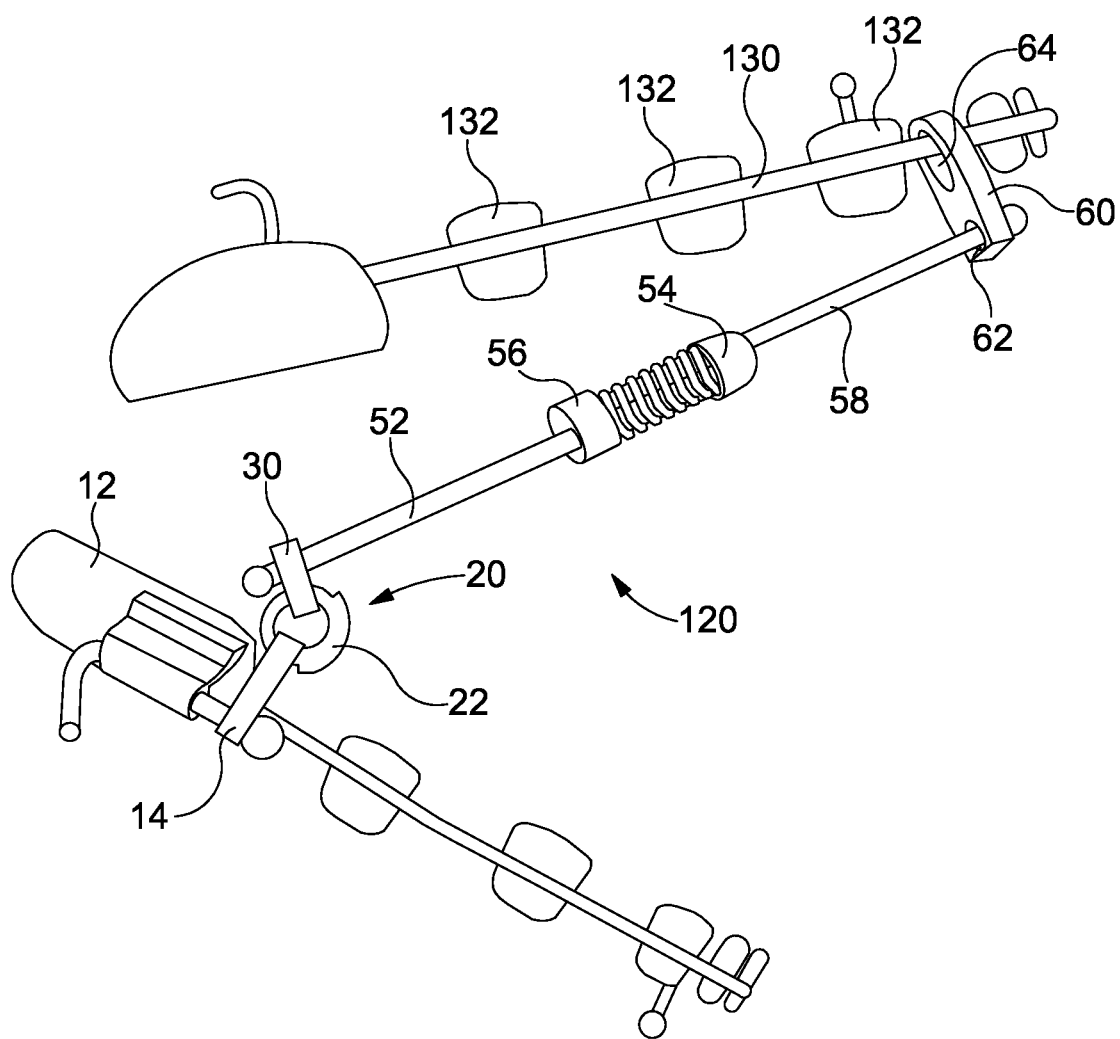
FIG. 3 illustrates the orthodontic device of FIG. 1 in a differing configuration.

FIG. 3A illustrates an orthodontic device 120. The device 120 is similar to the device 10 of FIG. 1 and the same reference numbers have been used to refer to the same components. The device 120 differs from the device 10 of FIG. 1 in that the molar band 18 and rod 70 have been omitted. Instead the void 64 of anchor plate 60 is attached to band 130 forming part of orthodontic braces attached to a patient's teeth by means of brackets 132.

In this configuration, the device may be used for treating Class II malocclusions by causing canine distalisation (i.e. movement of the canines in a posterior direction) and causing mandible advancement at the same time. Advantageously, the device 10 illustrated in FIG. 1 can, with minimal adaptation, be used in a different application. In certain embodiments, the device illustrated in FIG. 3A is inserted and, once the upper frontal segments have moved back sufficiently, the device may be turned around, the molar band 18 and rod 70 illustrated in FIG. 1 added, and the device then attached to upper and lower molars to cause an additional mandible anterior movement.

Figure 3B:
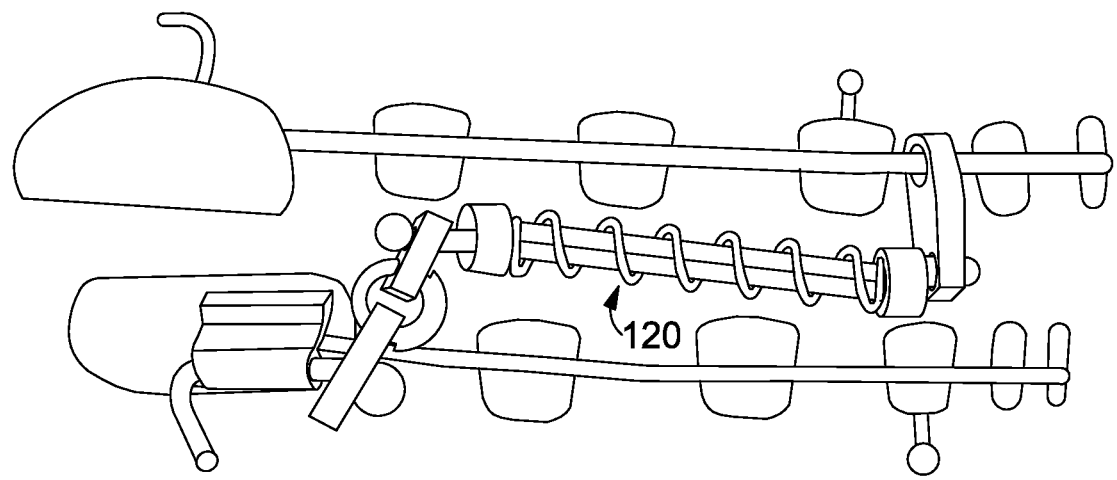

FIG. 3B illustrates the device 120 in the orientation when a user's mouth is closed.

Figure 4A:
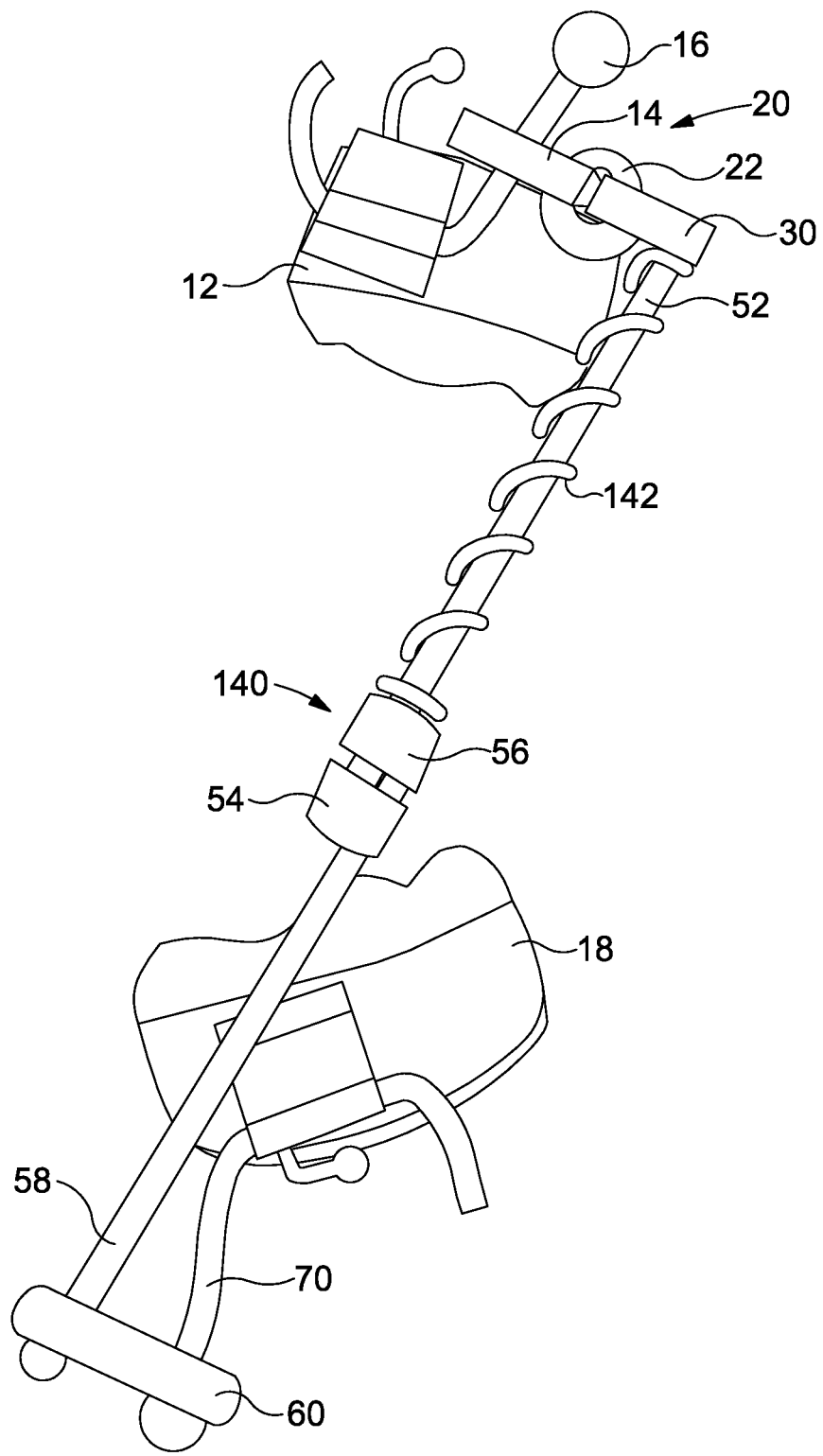
FIG. 4 illustrates the orthodontic device of FIG. 1 in a differing configuration.
Figure 4B:
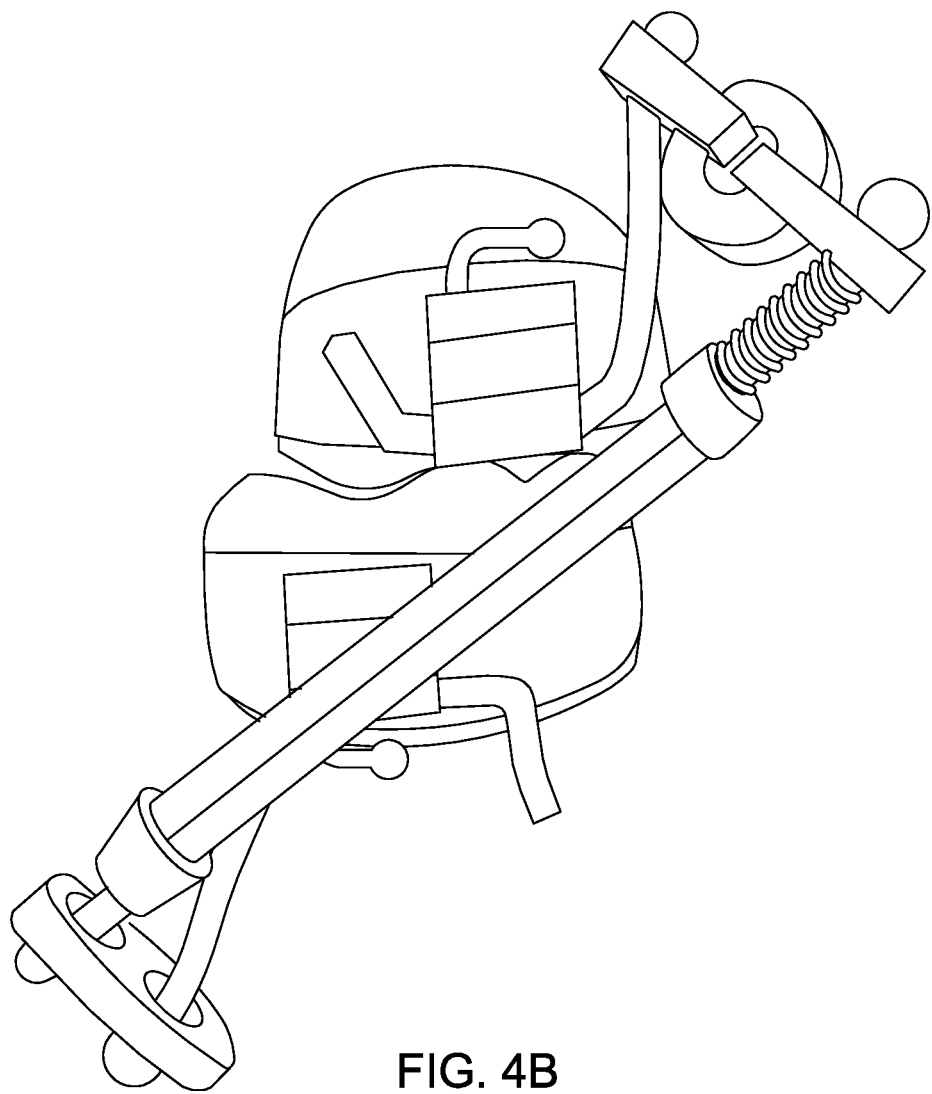

FIG. 4A illustrates a device 140 according to a further embodiment of the invention. The device 140 is similar to the device 100 illustrated in FIG. 2 and similar reference numerals are used to denote similar features. The device 140 differs from the device 100 in that spring 142 is located between collar 56 and anchor plate 30. FIG. 4B illustrates the device 140 in the orientation when a patient's mouth is closed.

Therefore, embodiments of the invention can easily be adapted to apply differing forces by locating a spring at different locations while still functioning as an elasticated orthodontic device in the appropriate circumstances.

Embodiments of the invention are able to combine mandible anterior positioning, upper molar distalization and intrusion of the lateral teeth segments in upper and lower dentition, particularly in vertical scull patterns. As described, embodiments of the invention provide reduced length compared to many devices found in the prior art. The reciprocating rods of the extension assembly provide rigidity when the mouth is closed and allow extension when the mouth is open.

In the arrangement illustrated in FIGS. 1 to 4, the rods 52 and 58 comprise two semicircular (i.e. D-shaped in cross-section) rods which reciprocate along their flat surfaces to provide rigidity and freedom of movement. It is to be realised that embodiments of the invention are not limited to semi-circular cross-sections. Other cross-sectional shapes may also be used.

FIGS. 5 to 10 illustrate alternate arrangements for the rods of the extension assembly. Different arrangements may be used to provide varying degrees of rigidity which has to be weighed up against varying degrees of complexity.

Figure 5A:
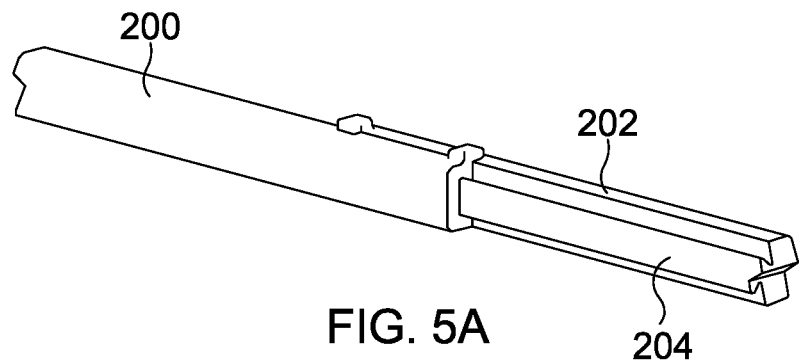
FIGS. 5 to 10 illustrate variations on the rod arrangements of the extension assembly of embodiments of the invention.
Figure 5B:
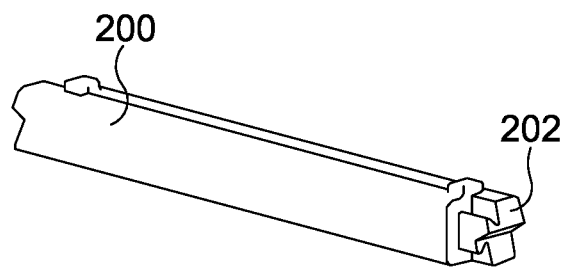

FIG. 5A illustrates rod 200 engaged with rod 202 with a tongue-and-groove arrangement. A tongue 204 is formed on rod 202. A corresponding groove is formed in rod 200. FIG. 5B illustrates the rods 200 and 202 in a closed arrangement.

Figure 6A:
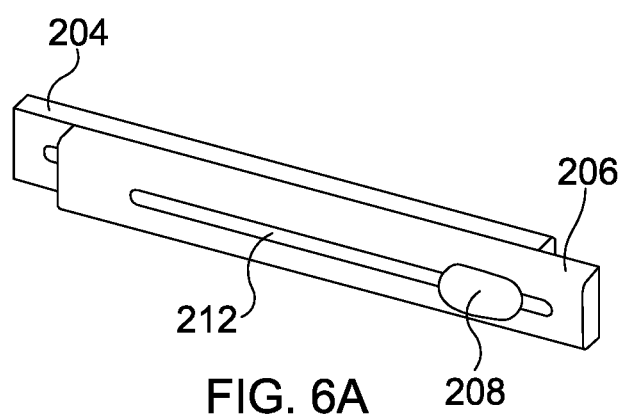
Figure 6B:
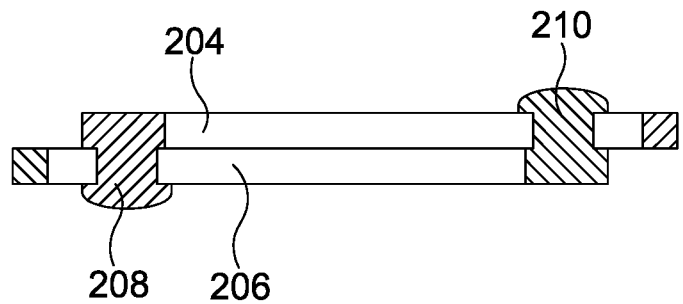
Figure 6C:
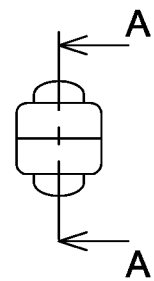

FIG. 6 illustrates an alternate arrangement with rod 204 reciprocating with rod 206. FIG. 6B illustrates a plan view in cross-section of the arrangement shown in FIG. 6A. Each of the rods 204 and 206 are formed with respective pins 208 and 210. As illustrated in FIG. 6A, the pin 208 of rod 204 is located within an elongate void 212 formed in rod 206. FIG. 6C is a plan view of the rods illustrated in FIG. 6A.ABs located in the voids form stops.

Figure 7A:
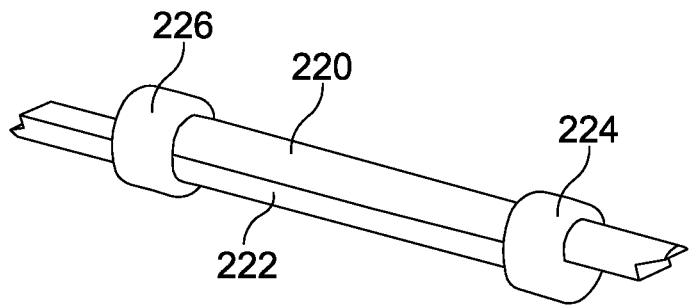
Figure 7B:
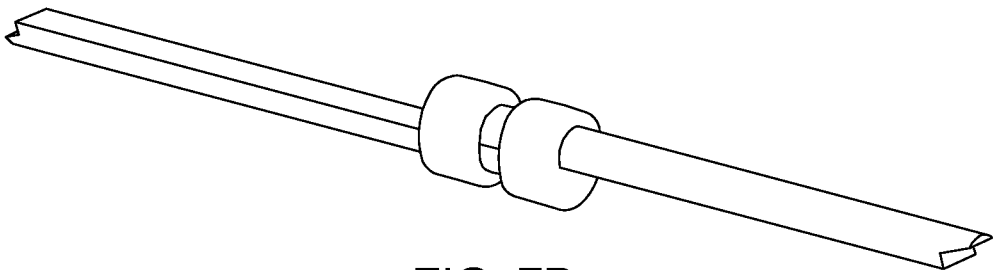

FIG. 7A illustrates to semicircular bars 220 and 222 having respective collars 224 and 226 attached thereto. The semicircular bars 220 and 222 reciprocate relative to one another (as illustrated in FIG. 7B) in the manner described above with reference to FIGS. 1 to 5.

Figure 8:
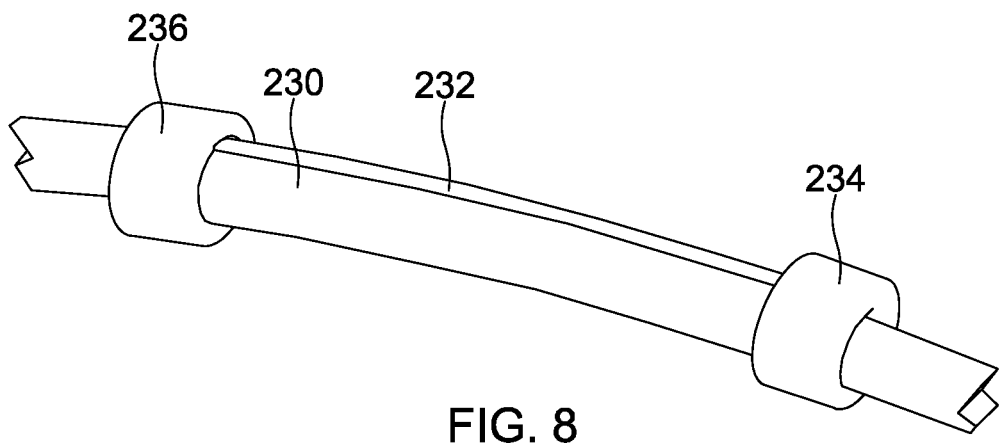

FIG. 8 illustrates an alternate arrangement where semicircular rods 230 and 232 are attached to respective collars 234 and 236. The semi-circular rods 230 and 232 are curved, but the principles of operation are the same as those previously described.

Figure 9:
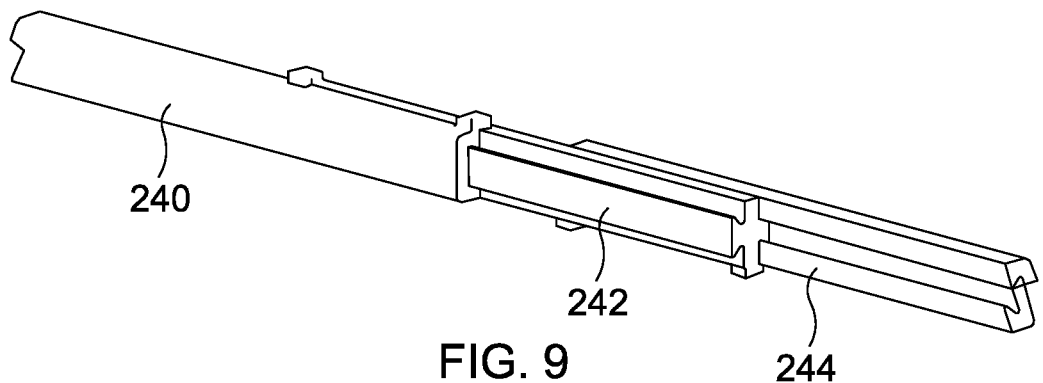

As illustrated in FIG. 9 an arrangement may include three bars 240 242 and 244, engagement one another with tongue-and-groove arrangements.

Figure 10A:
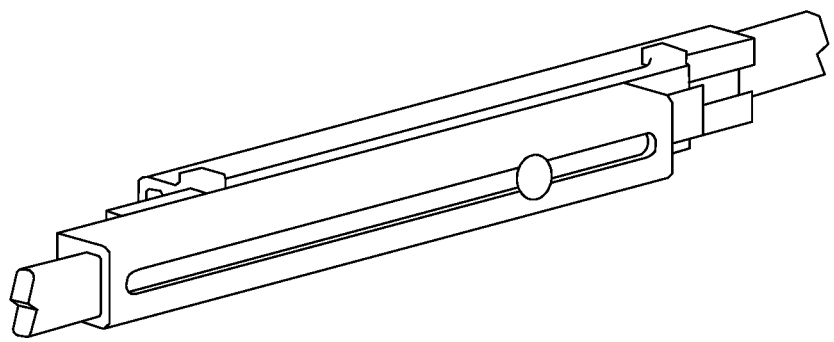
Figure 10B:
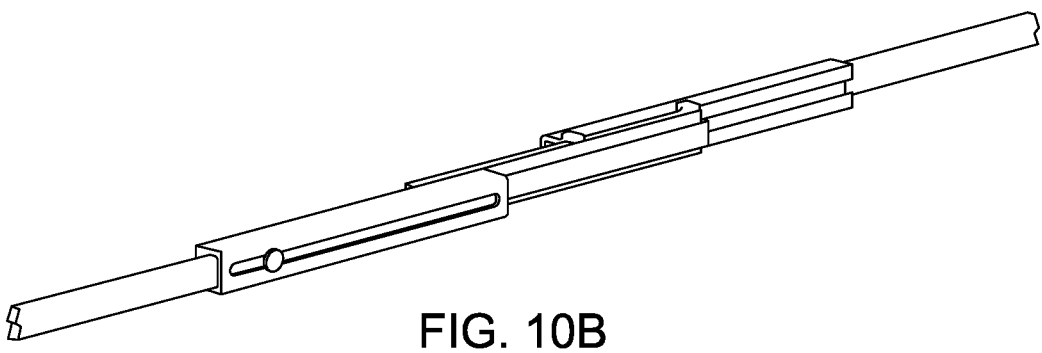

Alternatively, a combination of tongue-and-groove joins and pin-and-void joins may be used, as illustrated in FIGS. 10A and 10B.

Embodiments of the invention illustrate particular extension assemblies. It is to be realised that other arrangements may be used instead. In particular, PCT application PCT/EP2016/058522 discloses a number of arrangements suitable for use as extension assemblies, or as other parts of embodiments of the invention. The entire disclosure of PCT/EP2016/058522 is hereby incorporated by reference.

The invention claimed is:

1. An orthodontic device comprising:
a first band configured to attach the device to an upper molar;
a second band configured to attach the device to a lower molar;
an extension assembly connected by a first hinge to the first band and by a second hinge to the second band;
wherein at least the first hinge provides rotation about an axis wherein the axis is moveable relative to the first band; and
wherein the extension assembly comprises two extension rods including a first extension rod and a second extension rod, arranged to reciprocate relative to one another and attached to one another, wherein the extension assembly further comprises at least one stop to prevent elongation of the extension assembly past a first predetermined position and prevent compression of the extension assembly past a second predetermined position,
wherein the extension assembly comprises:
two collars including a first collar and a second, the two collars attached to respective ends of the two extension rods, wherein the first extension rod is mounted to the first collar and is situated within and movable relative to the second collar, wherein the second extension rod is mounted to the second collar and is situated within and movable relative to the first collar;
a spring located between the two collars; and
two anchor plates, wherein a first anchor plate is attached to the first extension rod, wherein a second anchor plate is attached to the second extension rod;
said stop being provided by said two collars and said two anchor plates, wherein the first collar and the second collar act as stops to prevent elongation of the extension assembly past the first predetermined position, and wherein the two anchor plates and the two collars act as stops to prevent compression of the extension assembly past the second predetermined position.

2. The orthodontic device according to claim 1 wherein the second extension rod is attached to the second anchor plate through a void formed on the second anchor plate.

3. The orthodontic device according to claim 1 wherein the extension assembly is adapted to receive a spring mounted between one of said collars and the first hinge.

4. The orthodontic device according to claim 1 wherein the two extension rods engage with one another with a tongue and groove joint wherein the tongue is formed length-wise in one of said extension rods and the groove is formed length-wise in the other of said extension rods.

5. The orthodontic device according to claim 1 wherein the two extension rods are engaged with one another by a pin attached to one of said extension rods and an elongate void formed in another of said extension rods so that said pin is located in said void to allow the extension rods to reciprocate.

6. The orthodontic device according to claim 1 wherein the extension rods are curved.

7. The orthodontic device according to claim 1 wherein the first hinge comprises a flail joint.

8. The orthodontic device according to claim 7 wherein the flail joint comprises a torus mounted in voids formed in the first band and in the extension assembly.

9. The orthodontic device according to claim 8 wherein the torus has a larger portion to limit movement of one of said voids relative to the torus.

10. The orthodontic device according to claim 1 wherein the second hinge comprises a ball pin mounted in a void formed in the second anchor plate of the extension assembly, wherein the void is larger than a diameter of a pin portion of the ball pin, thereby allowing the second band to move laterally and pivot relative to the extension assembly.

11. The orthodontic device according to claim 1, wherein the orthodontic device is reversible so that the second band is adapted to be attached to an upper canine and the first band is adapted to be attached to a lower molar, during use.

12. The orthodontic device according to claim 1 further comprising a spring located between a collar and at least one anchor plate.

13. The orthodontic device according to claim 1, wherein the orthodontic device is configured for use of any one or more of a group of:
   moving upper teeth in a posterior direction; and
   mandible advancement.

14. The orthodontic device according to claim 13, wherein, in a first configuration, the orthodontic device is suitable for moving the upper teeth in the posterior direction and for mandible advancement, and, in a second configuration the orthodontic device is suitable for additional mandible advancement.

* * * * *